United States Patent [19]

Beveridge et al.

[11] Patent Number: 5,621,492
[45] Date of Patent: Apr. 15, 1997

[54] DISTRIBUTED PHOTOGRAPHIC SYSTEM FOR TAKING SELF PORTRAITS

[75] Inventors: Iain M. Beveridge, Glasgow, Scotland; Henny F. Waanders, Eibergen; Machiel A. ten Brinke, Enschede, both of Netherlands

[73] Assignee: Polaroid Corporation, Cambridge, Mass.

[21] Appl. No.: 379,984

[22] Filed: Jan. 25, 1995

[51] Int. Cl.⁶ .................................................. G03B 29/00
[52] U.S. Cl. .............................. 396/2; 396/429; 386/121
[58] Field of Search ........................... 354/75, 76, 77, 354/78, 290; 348/61; 358/302, 335, 342, 345; 364/226.1

[56] References Cited

U.S. PATENT DOCUMENTS

| | | | |
|---|---|---|---|
| 3,398,664 | 8/1968 | Bonatsos | 354/81 |
| 3,820,133 | 6/1974 | Adorney et al. | 354/60 |
| 3,821,760 | 6/1974 | Kennedy et al. | 354/76 |
| 3,864,708 | 2/1975 | Allen | 354/290 |
| 4,072,973 | 2/1978 | Mayo | 354/295 |
| 4,089,017 | 5/1978 | Buldini | 354/81 |
| 4,130,834 | 12/1978 | Mender et al. | 358/127 |
| 4,687,526 | 8/1987 | Wilfert | 156/64 |
| 4,688,105 | 8/1987 | Bloch et al. | 358/335 |
| 4,738,526 | 4/1988 | Larish | 354/412 |
| 4,804,983 | 2/1989 | Thayer, Jr. | 354/76 |
| 4,805,027 | 2/1989 | Sluyter | 358/225 |
| 4,805,037 | 2/1989 | Noble et al. | 358/335 |
| 4,864,410 | 9/1989 | Andrews et al. | 358/443 |
| 4,891,660 | 1/1990 | Biondo, Jr. | 354/412 |
| 4,896,175 | 1/1990 | Thayer, Jr. | 354/76 |
| 4,959,670 | 9/1990 | Thayer, Jr. | 354/76 |
| 4,965,673 | 10/1990 | Bozzo et al. | 358/335 |
| 5,017,953 | 5/1991 | Biondo, Jr. | 354/83 |
| 5,023,638 | 6/1991 | Sigesleuthner et al. | 354/126 |
| 5,072,246 | 12/1991 | Thayer et al. | 354/78 |
| 5,184,160 | 2/1993 | Massarsky | 354/76 |
| 5,196,876 | 3/1993 | Thayer | 354/78 |
| 5,262,815 | 11/1993 | Aumiller | 354/290 |
| 5,270,751 | 12/1993 | Christian | 353/7 |
| 5,343,386 | 8/1994 | Barber | 364/400 |

FOREIGN PATENT DOCUMENTS

| | | | |
|---|---|---|---|
| 0262693 | 4/1988 | European Pat. Off. | G03B 17/48 |
| 0568468A2 | 11/1993 | European Pat. Off. | |

*Primary Examiner*—Howard B. Blankenship
*Attorney, Agent, or Firm*—Christopher P. Ricci

[57] ABSTRACT

A distributed photographic system for taking self portraits is disclosed which reduces cost as compared to conventional photographic booths by separating image acquisition and image rendering functions. Control over the system is also increased by allowing a remote operator in a commercial setting to remotely govern the image acquisition system. In the preferred embodiment, the image acquisition system utilizes a beam splitter to allow image bearing light to pass through into a video camera which then projects images through a liquid crystal display and back onto the beam splitter which reflects outwardly to the user. The user then can choose which video image the user wishes to have placed onto a hard-copy medium by indicating through a user panel that an image is acceptable. Upon doing so, the image is sent electronically to a remote printing station which is controlled by an operator. The user then goes to that operator to collect and pay for the hard-copy medium, thereby eliminating a need for additional automatic fund collecting systems.

5 Claims, 6 Drawing Sheets

DISTRIBUTED PHOTOGRAPHIC SYSTEM FOR TAKING SELF PORTRAITS

BACKGROUND OF THE INVENTION

The present invention relates generally to photographic apparatus and, more particularly to distributed photographic systems for taking self portraits which are user actuated to capture an image when the user strikes a desired pose. If the user accepts the image then the image is transmitted to a remote print station.

Coin operated photofinishing booths having fixed lens cameras for taking self portraits are well known. Such prior art photofinishing booths take a series of photographs or a single photograph of an individual or group of individuals sitting in a booth at a fixed location in front of the camera. The photographs are then developed in the booth and dispensed to the user. The booth serves to constrain the position and poses of the user as well as limiting the number of persons within the field of view. Illustrative systems of such automatic photography equipment can be found in U.S. Pat. Nos. 3,820,133; 3,864,708; 4,072,973; 4,089,017; 4,738,526; and 5,017,953. These prior art photofinishing booths show the use of coin actuated self-developing equipment which do not allow for a user to be able to choose a particular image to be printed before it is rendered onto a hard-copy medium. Further, since they are fully automated there is also no attendant nearby to monitor proper treatment and operation of the system. Additionally, such photofinishing booths are fully integrated and are, therefore, very expensive. They require the booth itself, mechanical systems for receiving money and giving appropriate change, along with the photographic and developing systems. And with such multiple systems, there are multiple points of failure. When one or more of these systems does fail, again there is no attendant available to make such repairs easily because they are completely automated booths.

Other commercially available systems for taking portrait photographs include distributed systems that have separate video cameras and video monitors. Some of these distributed systems do allow an operator to choose an image captured by a video camera before it is printed. However, those systems require the operator to videophotograph a subject and to make subjective decisions as to which frame should be printed. These systems are also inefficient in terms of time in that the operator must wait while the subject readies himself and poses and must then capture the image. If the image is unacceptable, then the process must be repeated thus wasting both people's time. Along with these disadvantages, this type of distributed system requires the operator to constantly monitor and utilize the equipment and simply allows the subject no active participation other than to be photographed.

Accordingly, it is an object of this invention to provide a low-cost photographic system for taking self-portraits.

It is another object of this invention to limit a need for operator participation and allow a user to actively interact with the photographic system to choose a frame to be printed upon hard-copy media.

It is still another object of the invention to provide a distributed system which allows a remote operator to govern operation of the system such that a user cannot tamper with the photographic system.

It is a further object of the invention to provide a self-service photographic system which is operable by a user but is distributed such that a local operator is available when needed to handle occasional problems within the system.

These and other objects of the invention will be obvious and will appear hereinafter.

SUMMARY

The aforementioned and other objects are achieved by the invention which provides a low-cost distributed photographic system for taking document-quality photographs which allows a user a choice of images to be printed on a hardcopy medium. The photographic system is for use in a commercial setting where an operator can be located remotely, at a cashier's counter for example. The photographic system comprises image acquisition means and image rendering means.

The image acquisition means captures image bearing light reflected from a user and a surrounding scene. The image bearing light is converted into an electronic image signal by a video camera held therein. A continuous sequence of images represented by the image bearing light are then displayed on a video monitor allowing the user to see an electronic representation of himself. The user can adjust his appearance and pose while viewing the results on the video monitor.

The image acquisition means is user controlled to allow the user to choose a single image from the continuous sequence of images. In this way, the user can signal to the image acquisition means that a desired pose has been struck. The image acquisition means then flashes a strobe and grabs a subsequent frozen image. The frozen image is presented to the user for approval.

If the frozen image is acceptable it is transmitted to the image rendering means which is situated remotely and in electrical communication with the image acquisition means. The image rendering means prints the frozen image either upon a command from the operator or automatically. In this way the operator can govern print processing and subsequent delivery to the user. For example, if image print quality is inadequate the operate can reprint the image and can then withhold the printed image until payment is rendered therefor.

Distributing the photographic system in this way enables an operator to handle problems such as inoperative elements of the photographic systems and is available to remotely disable the system if the operator feels that it is being abused.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

A distributed photographic system is disclosed which can be used in commercial settings to take document-quality self-portraits. The photographic system allows a user to model and choose exactly what pose that the user likes, and freeze the image to view on a video screen what the photograph will look like. If the image is acceptable, the user then sends the image to a print station where the frozen image is printed on a hard-copy medium and is purchased by the user from a system operator.

Figure 1:
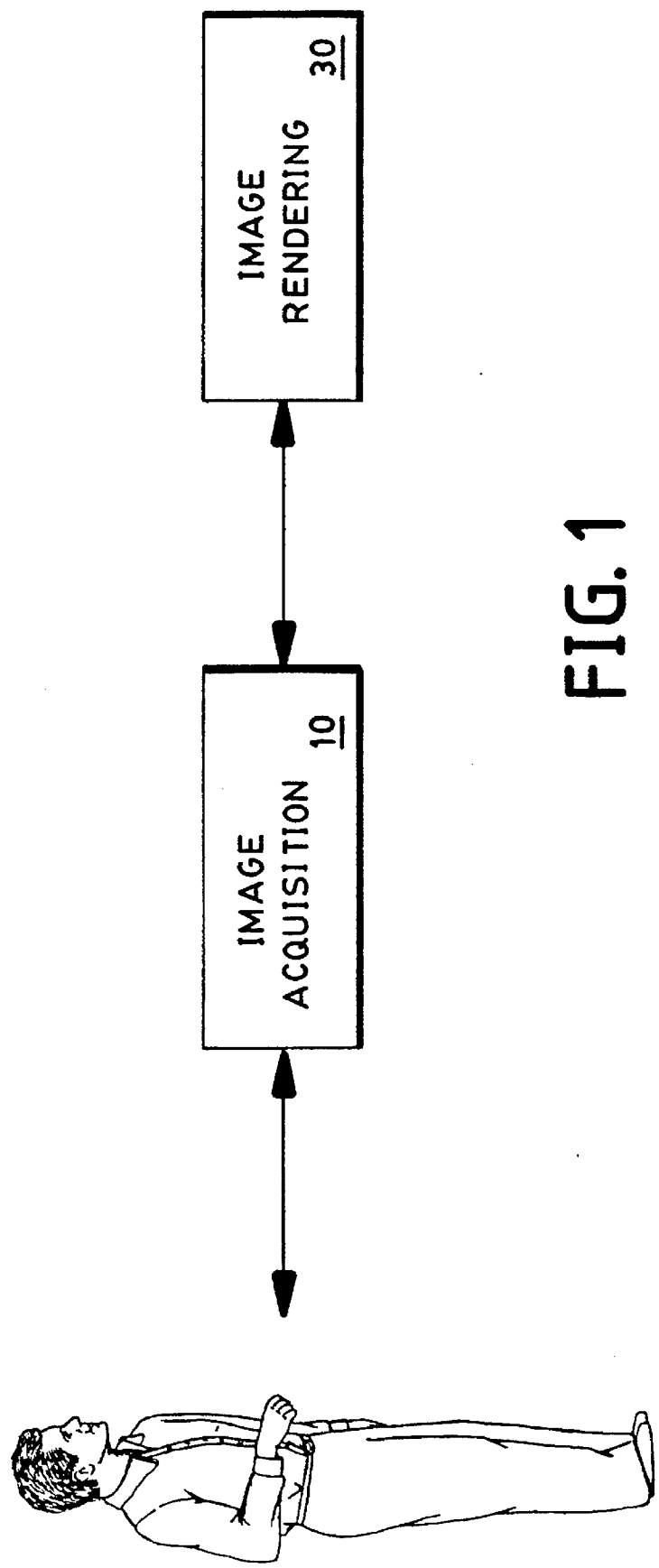
FIG. 1 shows a block diagram of a photographic system in accordance with the invention.

FIG. 1 shows a block diagram of the distributed photographic system. A user 8 interfaces with an image acquisition system 10 where the user 8 dynamically views real time video images of the user 8. Upon choosing an image which is acceptable, the user 8 signals to the image acquisition system 10 to freeze the image so that it can be viewed by the user 8. If the image is acceptable, the user 8 sends another signal through the image acquisition system to an image rendering system 30 to print the image onto a hard-copy medium. The image acquisition system 10 and the image rendering system 30 are distributed such that the user can interface directly with the image acquisition system 10 and the image rendering system can be remotely located near an operator in the commercial setting who is free to perform other tasks independent from the photographic system.

Figure 2:
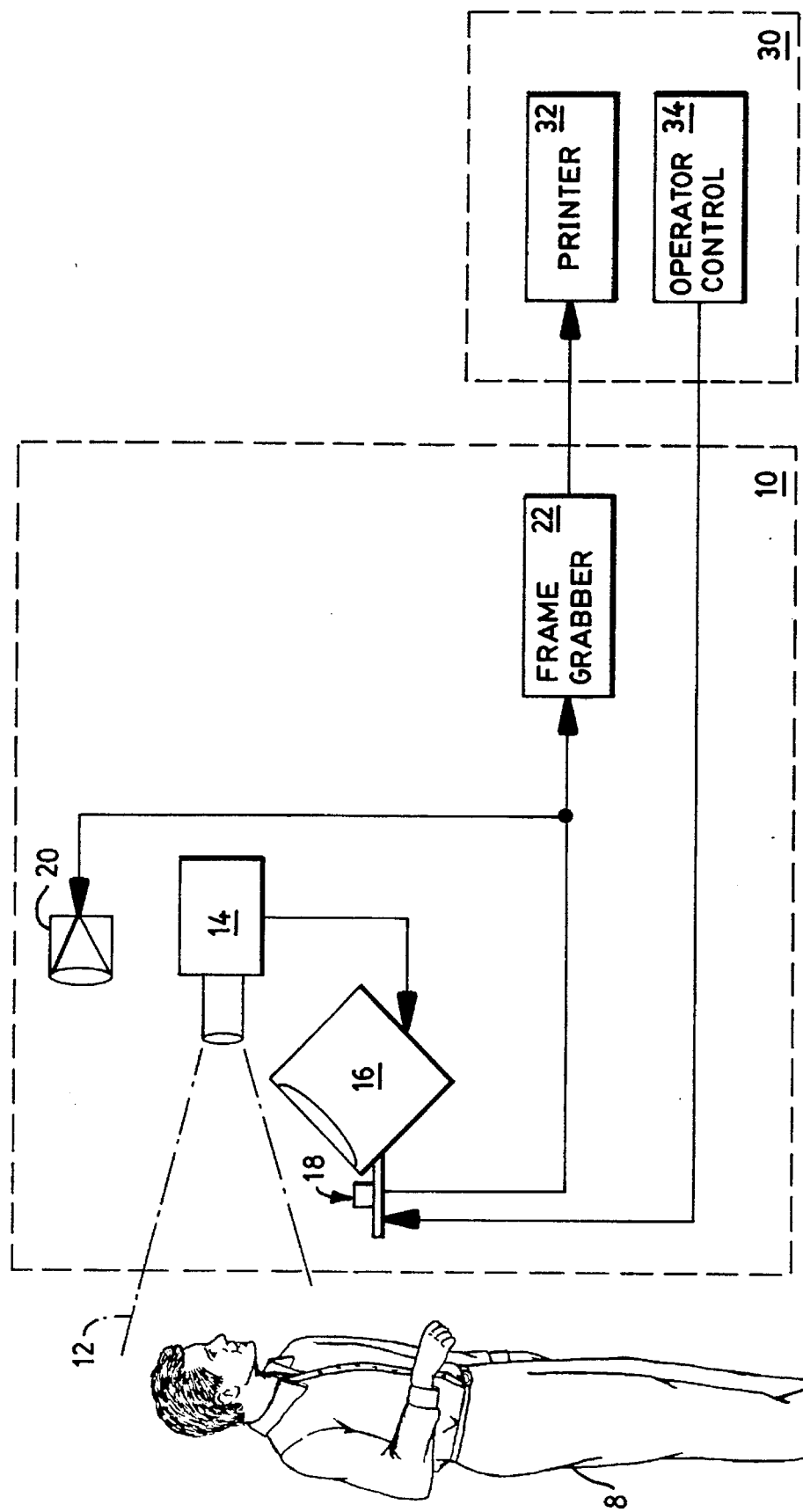
FIG. 2 shows a schematic diagram utilizing photographic system of FIG. 1.

FIG. 2 depicts a more detailed block diagram of the photographic system of the invention. The user 8 walks into a field of view of the photographic system such that image-bearing light 12 is reflected off of the user 8 into the image acquisition system 10 where it is captured by a video camera 14. The video camera 14 electronically translates the image bearing light 12 into electronic signals which are then sent to a video monitor 16. The monitor 16 displays video images representative of the image-bearing light 12. In practice, the user 8 is standing in front of the image acquisition system 10 looking into the monitor 16 and what is displayed thereon is an electronic portrayal of the user 8, similar to looking into a mirror.

The user then utilizes a user interface 18 to indicate when a desired pose has been struck. During a period that the user 8 is posing and choosing which video image is preferred, modeling lights are illuminating the user 8 and the user's surrounding area.

Upon choosing an image, the user 8 signals through the user interface 18 that an image is acceptable by hitting a print button. That action causes a strobe light 20 to flash and the next subsequent image out of the video camera 14 to be captured by a frame grabber 22. The frame grabber 22 freezes the image and sends the frozen image, an electronic still image, to a remote printer 32 in the image rendering system 30.

As previously stated, the image rendering system is remote from the image acquisition system. By situating this remotely in a commercial setting, an operator can control print output while not restricting the operator's other duties. The operator can, for example, choose not to print the output until the user 8 comes over to a counter and pays for the images. The operator performs this task by utilizing operator controls 34. The operator also has additional powers to remotely shut down the image acquisition system 10 if, for example, the operator believes that the image acquisition system 10 is being abused. The operator can also choose to reprint the image if the printed output is not of acceptable quality. The reprint simply retransmits the image data to the printer without a need to capture a new image.

Figure 3:
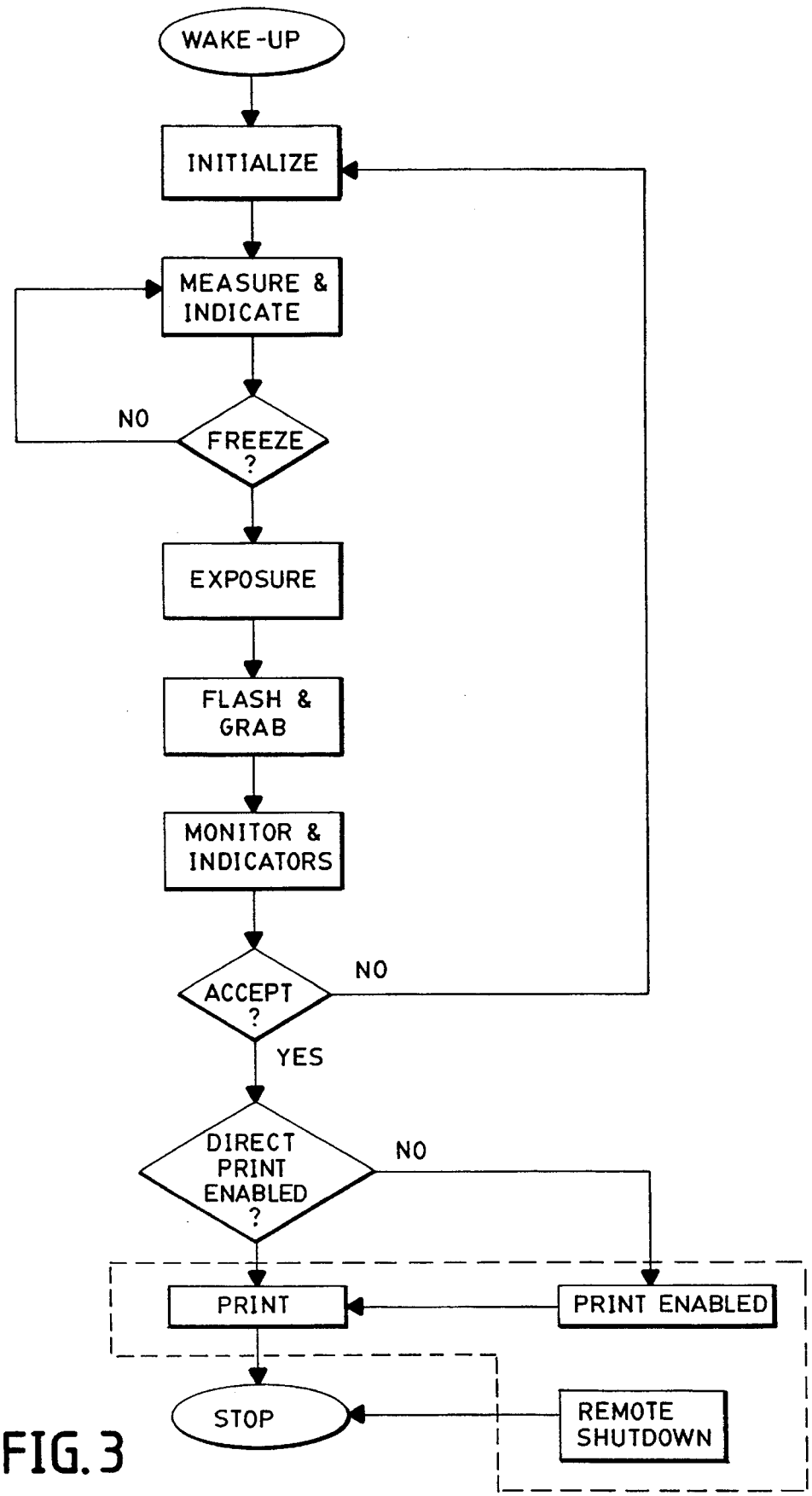
FIG. 3 shows a data flow diagram of a photographic system such as that shown in FIG. 1.
Figure 4:
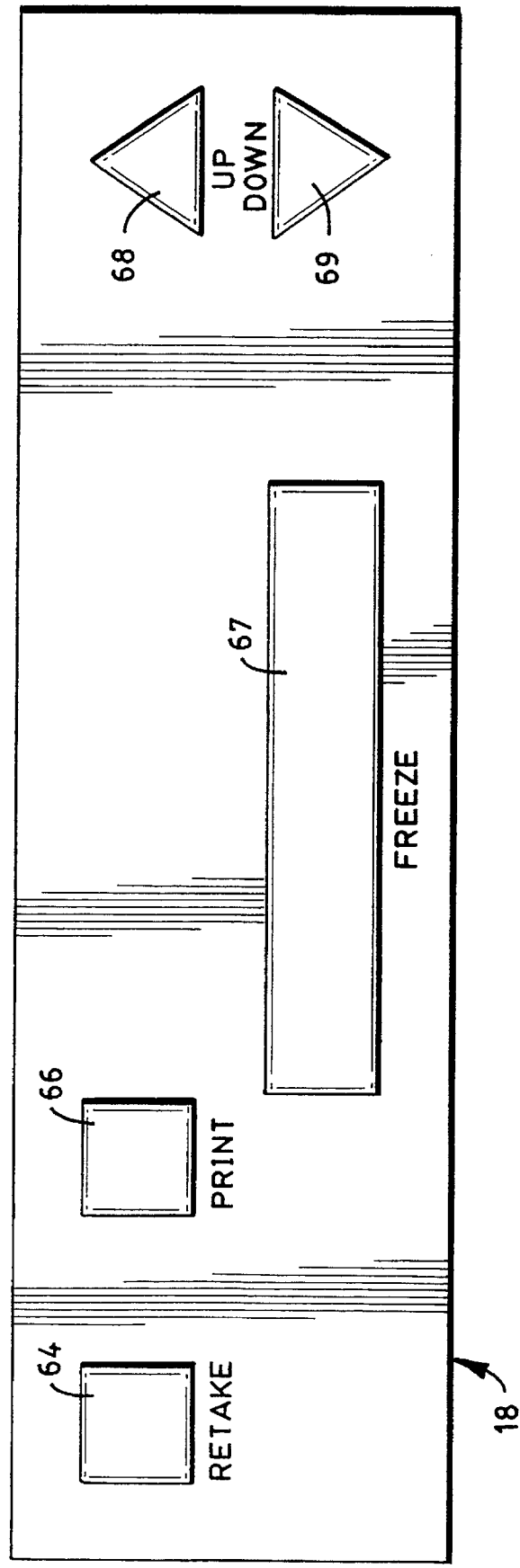
FIG. 4 shows a typical user interface in accordance with the invention of FIG. 1.

FIG. 3 illustrates a flow diagram of the photographic system of the invention and will be described with reference to FIG. 4 which is a typical user interface 18 for use with the invention. Upon approaching the image acquisition system 10, the user 8 enters a field of view of the image acquisition system 10. The image acquisition system 10 then automatically detects the presence of that person through an ultrasonic transducer or another similar device well known in the art. The image acquisition system 10 then sets itself in an active mode by lighting up the video monitor 14 and appropriate buttons and controls on the user interface panel 18.

The latter two steps are part of an initialization procedure which also includes charging up a strobe capaciter (not shown) which will ultimately be used to fire a strobe light 20. Once the strobe capaciter is fully charged, modeling lights activate to illuminate the user thus presenting enhanced image forming light 12 to the video camera 14.

One embodiment of the invention also includes a voice module which then welcomes the user, instructs the user to pose and gives various other voice commands.

A sonar ranging system then measures a distance to the user 8 and gives an indication of whether the distance is correct, too far, or too close. The user 8 then has an opportunity again through the interface 18 to alter the measured distance by pressing UP 68 and DOWN 66 buttons to zoom the video camera 14 in or out to enhance the ultimate image.

Upon completion, the user then poses, adjusts himself or herself appropriately, and when ready indicates so by pressing a freeze button 67 on the user interface 18. A countdown display is then indicated on the monitor showing the user 8 when the exact picture taking moment will be. This can range from instantaneously up to three seconds. During this time, the charge on the strobe capacitor is checked and an iris control on the video camera 18 is changed from a large aperture utilized when modeling to a fixed small aperture thereby increasing depth of field.

The strobe 20 is then fired to correct the exposure by eliminating fluctuations in ambient light intensity and color temperature.

At the end of the countdown, the strobe 20 fires and the video camera 14 captures the image which is frozen by the frame grabber 22 and is displayed on the video monitor 16. User controls on the user interface 18 are then illuminated to allow the user 8 to accept the frozen image being displayed by pressing PRINT 66 or to redo the frozen image by pressing RETAKE 64. Pressing RETAKE 64 causes the image acquisition system 10 to repeat the above process.

If the image is accepted, then the next question asked by the system is whether a direct print is enabled. This question is answered by the operator controls 34 in the print rendering system 30. If the operator controls 34 indicate that a direct print is not enabled, then the image is queued awaiting a command from the operator through the operator controls 34 that the frozen image should be sent to the printer. This allows the operator to only print once the user 8 has approached the operator to pay for the photograph, for example. If direct print is enabled or the operator sends the command to print, the image is sent to a color video printer where it is printed upon hard-copy medium. The printer can be any of a range of printers including but not limited to color laser printers, photographic printers, or even black and white printers.

The user may then stop and go over to the operator who has the hard copies of the image or may continue to take additional photographs.

The operator, at any point in time, can also remotely shut down the system from the operator controls 34 thus allowing the operator to remotely control operation of the image acquisition system.

Figure 5:
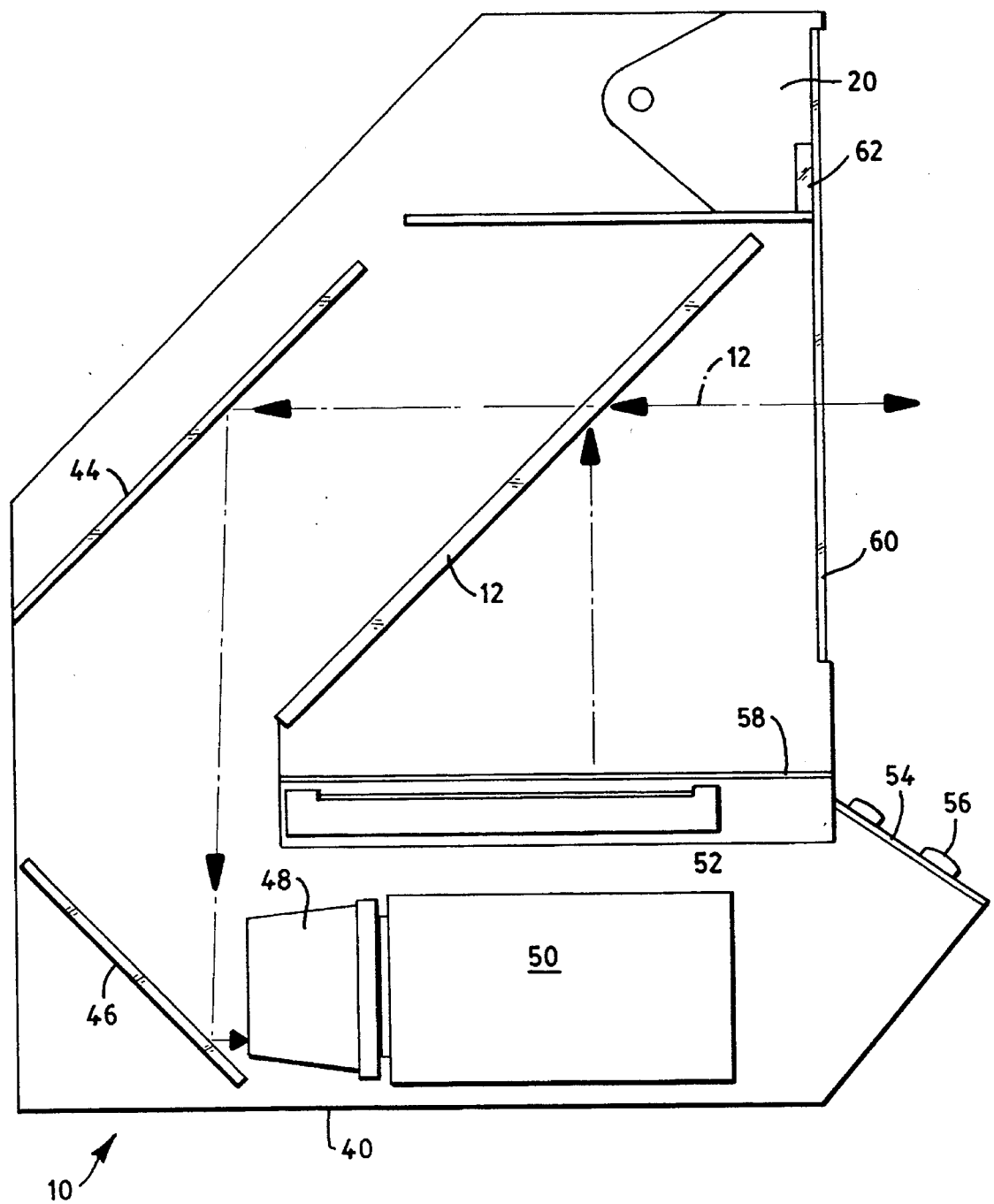
FIG. 5 illustrates a detailed schematic diagram of an image acquisition station in accordance with the invention.

FIG. 5 illustrates a preferred embodiment of the image acquisition system 10. In this embodiment, the image acquisition system 10 is fully enclosed within a single housing 40. The image bearing light 12 then travels into the housing 40 through a transparent, fully transmissive glass panel 60 along a path indicated by dashed lines. The image bearing light 12 passes through a beam splitter 42 which transmits a fixed percentage of the image bearing light 12. In the preferred embodiment, the beam splitter 42 transmits approximately 60% of the image bearing light. The beam splitter 42 is also achromatic in that it transmits and reflects a wide range of wavelengths of light regardless of color.

The beam splitter 42 is introduced into an incident beam of radiation to divide the beam into two beams of approximately equal relative spectral composition but propagating into two different directions. In the preferred embodiment, the beam splitter 42 is a half silvered mirror having a silver layer density proportional to that of a desired amount of light to be transmitted therethrough.

The transmitted light is then reflected off of mirrors 44 and 46 and is directed into a lens 48 on a video camera 50.

The image is enhanced by augmenting ambient light with artificial lighting. Modeling lights are used which are shown collectively with the strobe light 20. The video camera 50 also sharpens the image by adjusting the lens 48 according to a distance to the subject 8. The distance is determined using a sonar ranging system having a sonar transducer 62, or other such ranging system well known in the art.

The video camera 50 translates the transmitted light into an electronic image signal which is passed to a liquid crystal display panel ("LCD") 52. The LCD panel 52 serves as the previously described video monitor 16 in that it displays the electronic image back to the user. This is achieved by projecting the electronic image onto the beam splitter 42 which then reflects the electronic image outward toward the user through the glass panel 60 as indicated by the dashed line.

Along with the image on the LCD panel 52, user instructions are displayed to the user 8. The instructions are projected from a user instruction panel 58 to assist the user 8 in operating the image acquisition system 10.

A user interface panel 54 is provided having a series of buttons 56 operating as previously described.

Figure 6A:
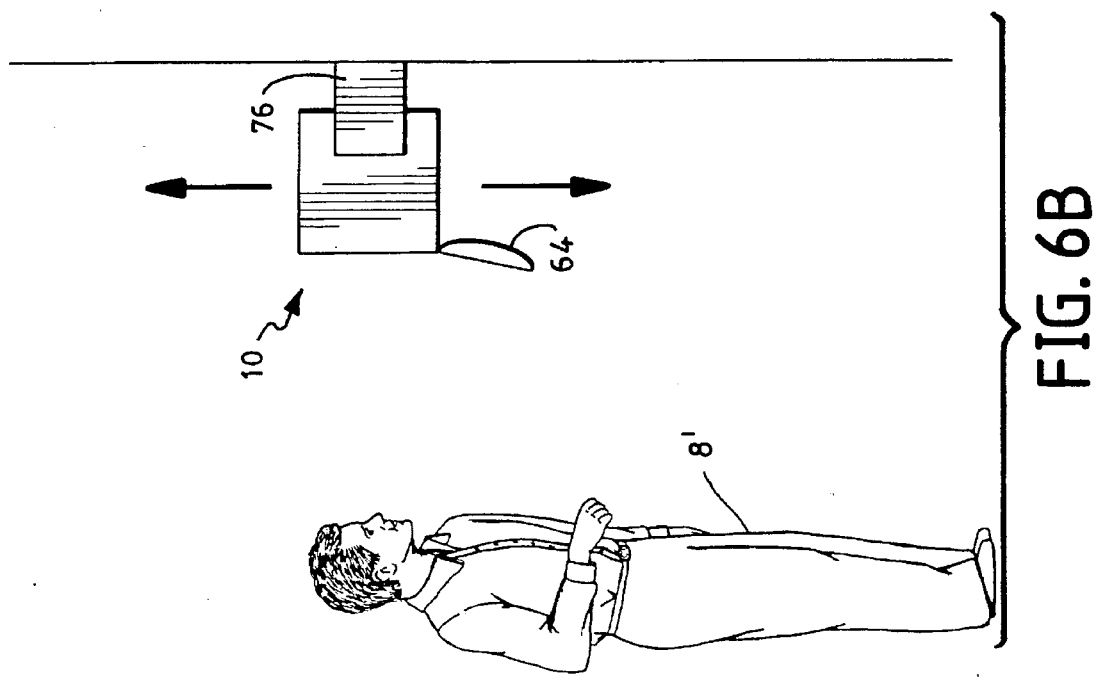
FIGS. 6A and 6B illustrate how the photographic system of FIG. 1 can be mounted in a commercial setting.
Figure 6B:
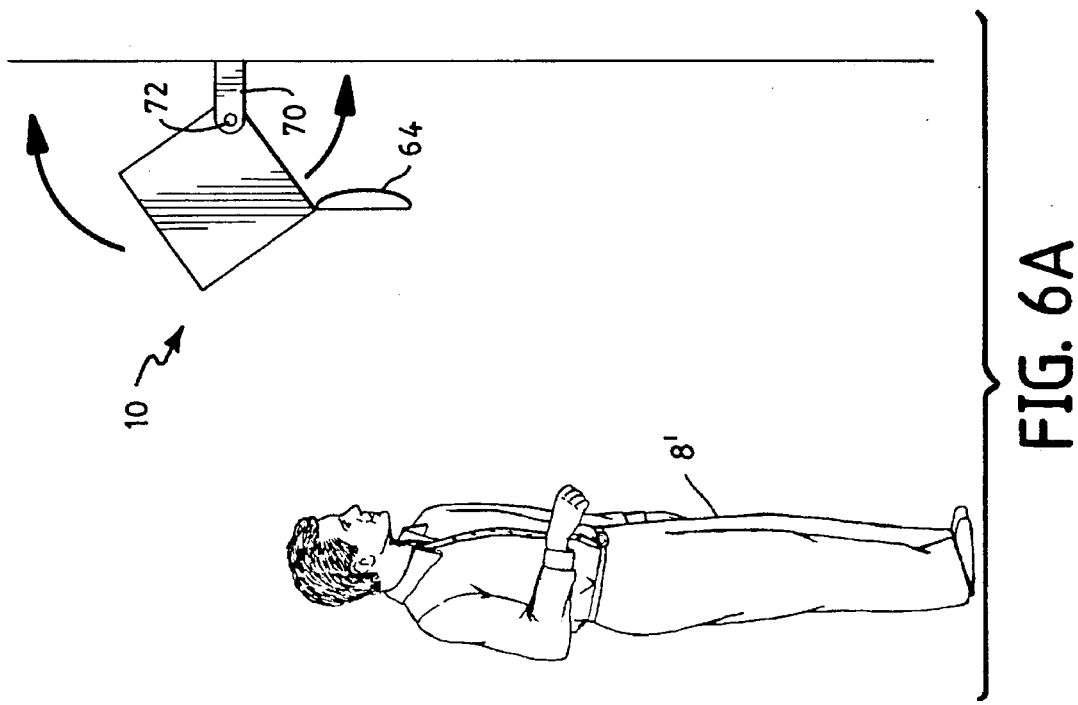

FIG. 6A and 6B illustrate how the image acquisition system can be mounted in a commercial setting to allow users of all different sizes to operate the system. FIG. 6A shows the image acquisition system 10 mounted on a pivot arm 70. The pivot arm is fixedly disposed on an adjacent lateral wall and extends outwardly therefrom. Passing through the pivot arm 70 is a bolt 72 acting as a pivot point into the image acquisition system 10. The user can then manually adjust the image acquisition system 10 about the pivot point 72 allowing the image acquisition system 10 to be aimed at all different sized people, such as a small child 8'.

FIG. 6B shows an alternative method of height adjustment for the image acquisition system 10. Here the image acquisition system 10 is in a bracket 76 which is located in a track permanently attached to an adjacent lateral wall. The bracket 76 slides upwardly and downwardly relative to the wall allowing height adjustment for people of varying height.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A photographic system for taking self-portraits in a commercial setting having an operator for vending items in the commercial setting and for receiving payment therefor at a vending station, said photographic system comprising image acquisition means for capturing image bearing light reflected from a user and electronically displaying a continuous sequence of images represented by the image bearing light, said image acquisition means being user controlled to allow the user to choose a single image from the continuous sequence of images; and image rendering means in electrical communication with the image acquisition means for printing said single image to create a printed image, the image rendering means being located remotely from the image acquisition means and controlled by the operator to govern print processing and delivery to the user and being disposed proximal to the vending station such that the operator can receive payment for the printed image.

2. The photographic system according to claim 1 wherein said image acquisition means further comprises a video camera in optical alignment with an optical path of said image bearing light such that the video camera translates images transmitted by the image bearing light into signals representative of the images;

a monitor in electrical communication with the video camera for displaying the images to the user at video rates along the optical path; and a frame grabber in electrical communication with the video camera such that upon actuation by the user, the frame grabber captures the single image from the video camera to be sent to the image rendering means for printing.

3. The photographic system according to claim 2 wherein said image acquisition means further comprises user interface means for transmitting instructions to and from the user via the monitor.

4. The photographic system according to claim 1 wherein said image rendering means further comprises control means for governing flow of the image signals to the image rendering means by allowing the operator to selectively queue a single image.

5. The photographic system according to claim 4 wherein said control means further comprises shutdown means for remotely rendering inoperable the image acquisition means at the discretion of the operator.

* * * * *